Patented May 4, 1954

2,677,693

UNITED STATES PATENT OFFICE 2,677,693

HALOGENATED DIBENZANTHRONES AND DIBENZANTHRONYLS AND METHOD OF PRODUCING THE SAME

Paul Nawiasky, Summit, and Guido R. Genta, Hillside, N. J., assignors to General Aniline & Film Corporation, New York, N. Y., a corporation of Delaware No Drawing. Application September 28, 1950, Serial No. 187,361

8 Claims. (Cl. 260—356)

1

The present invention relates to novel halogenated dibenzanthrones and dibenzanthronyls and a method of producing the same.

It is customary procedure in halogenating dibenzanthrones and dibenzanthronyls to dissolve the products in a solvent such as sulfuric acid, chlorsulfonic acid or the like, and to subject the solution to the action of a halogen such as chlorine or bromine, in the presence of a halogen carrier such as sulfur or iodine, or as suggested in United States Patent No. 1,791,215, a metal such as antimony.

This procedure leads to bromo or chloro derivatives or if both bromine and chlorine have been used as the halogenating agent, derivatives containing mixed halogens. Such products have been used directly as dyestuffs, or in some cases as intermediates for the formation of vat dyes.

Dibenzanthrone may be typified by the following formula:

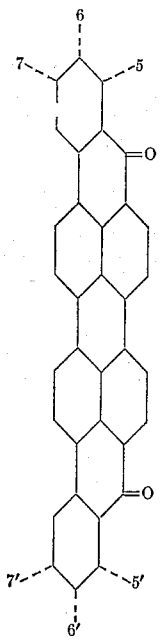

When halogenating this product as above, the exact positions assumed by the halogen atoms are not known. However, the 6 and 7 positions appear to be most privileged, and it is generally assumed that the halogens enter the molecule at these positions.

We have now discovered that products different from those previously obtained are produced by halogenating dibenzanthrones or dibenzanthronyls while dissolved in a solvent such as sulfuric acid or chlorsulfonic acid, in the presence of an anhydrous aluminum halide such as aluminum chloride or aluminum bromide as a halogen carrier.

Such halogenated products and the method of producing the same constitute the purposes and objects of our invention.

As stated, the products which we propose to halogenate are dibenzanthrones or dibenzanthronyls. Examples of such products which we have halogenated by our procedure are dibenzanthrone, isodibenzanthrone, 2,2'-dibenzanthronyl, Bz1-Bz1-dibenzanthronyl, Bz1-Bz1'-dibenzanthronylsulfide, Bz1-Bz1'- dibenzanthronyldisulfide (see USP 1,712,646), Bz1-Bz1'-benzanthronylsulfoxide, Bz1-Bz1'-benzanthronylsulfone (see USP 1,736,081).

In effecting the halogenation of these products, they are subjected to the action of bromine or chlorine while dissolved in a suitable solvent such as concentrated sulfuric acid or chlorsulfonic acid, and in the presence of a small amount of anhydrous aluminum chloride or aluminum bromide. The quantity of the aluminum halide is practically catalytic, ranging as it does from about 25 to 60% by weight of the material subjected to halogenation. During the halogenation, the temperature of the reaction should be maintained from about 20 to 30° C.

The products produced by our halogenation method have properties which are materially different from those produced by the conventional method. This difference appears to be attributable to the fact that the halogen atoms in our procedure enter the molecule in different positions from those assumed in the usual halogenation method. The products are primarily dihalogenated compounds.

It is recognized that previous proposals involved the halogenation of ketones in a melt of aluminum chloride and sodium chloride. It is evident that in these processes, the quantity of aluminum chloride must be quite high, since it must assure the formation of a fluid melt.

Our procedure involving only catalytic amounts of the aluminum chloride suspended in a solvent, therefore, has no analogy to the use of aluminum chloride in a fused melt.

Our invention is further illustrated by the following examples, although it is to be understood that the invention is not restricted thereto.

The parts are by weight unless otherwise stated.

Example 1

46 parts of anhydrous ground aluminum chloride are suspended in 920 parts of chlorsulfonic acid, while maintaining the temperature at 25° C. 92 parts of dibenzanthrone are dissolved in the suspension, 44 parts of bromine are added and the mass is then stirred for 24 hours. The reaction mixture is drowned in ice water and the solid is isolated. It is a dibromodibenzanthrone containing 27% of bromine. The yield is 120 parts.

It compares with the product obtained using sulfur or iodine as catalysts as follows:

|  | AlCl₃ | S or I |
|---|---|---|
| H₂SO₄ | bluish violet | red violet. |
| Vat | bluish violet | reddish violet. |
| H₂SO₄+HNO₃ | green→red violet | green→blue. |
| Shade | blue | blue. |

Example 2

The procedure is the same as in Example 1, excepting that 23 parts of anhydrous aluminum bromide are used in lieu of the aluminum chloride. A product is obtained which is very similar to that of Example 1, containing 28.7% bromine. The product shows the same properties as given for that of Example 1.

Example 3

46 parts of anhydrous aluminum chloride are suspended in 920 parts of chlorsulfonic acid. The temperature is maintained at 25° C. and 92 parts of isodibenzanthrone are dissolved in the suspension. After the addition of 40 parts of bromine, the reaction mixture is agitated at 25 to 30° C. for a period of 24 hours. The mixture is diluted with ice and the resulting product is isolated. It is a dibromoisoviolanthrene containing 28% bromine. It dyes fibers from a blue vat in brilliant violet shades somewhat bluer and brighter than those obtained from the product produced when using sulphur as a halogen carrier.

The following is a comparison of the properties of the two products:

|  | S | AlCl₃ |
|---|---|---|
| H₂SO₄ | green | green. |
| H₂SO₄+HNO₃ | brown | dull violet. |

Example 4

46 parts of ground anhydrous aluminum chloride are suspended in 920 parts of chlorsulfonic acid. While maintaining the suspension at 25° C., 92 parts of 2,2'-dibenzanthronyl are dissolved in it. 39 parts of bromine are added to the solution, and it is then agitated for 24 hours at 25 to 30° C. The isolated compound is a dibromodibenzanthronyl forming a greenish powder and containing 25.7% bromine.

Example 5

The procedure is the same as in Example 4, excepting that 92 parts of Bz1-Bz1'-dibenzanthronyl are used in lieu of the 2,2'-dibenzanthronyl. The compound obtained is a dibromo Bz1-Bz1'-dibenzanthronyl containing 27% of bromine. The product is in the form of a reddish powder.

Example 6

The procedure is the same as in Example 4, excepting that there are used 92 parts of Bz1-Bz1'-dibenzanthronylsulfide. The resulting compound is a yellowish brown powder containing 30% bromine and consists mainly of dibromo Bz1-Bz1'-dibenzanthronylsulfide.

Various modifications of the invention will occur to persons skilled in the art. Thus as is evident, any one of the dibenzanthronyl derivatives referred to above may be used in lieu of the specific ones mentioned in the examples.

We, therefore, do not intend to be limited in the patent granted, except as necessitated by the prior art and the appended claims.

We claim:

1. The process of halogenating dibenzanthrones and dibenzanthronyls which comprises reacting the same at a temperature ranging from 20 to 30° C. while dissolved in a solvent selected from the class consisting of concentrated sulfuric acid and chlorsulfonic acid with a quantity of a free halogen sufficient to insure dihalogenation, and in the presence of from about 25 to 60% by weight of the material halogenated, of an anhydrous aluminum halide as the halogen carrier.

2. The process of halogenating dibenzanthrones and dibenzanthronyls which comprises suspending about 25 to 60% by weight thereof of an anhydrous aluminum halide in chlorsulfonic acid, dissolving therein the material to be halogenated, adding a quantity of free halogen sufficient to effect dihalogenation, and stirring the reaction mixture at a temperature ranging from 20 to 30° C. to effect dihalogenation.

3. The process of producing dibromodibenzanthrone containing about 27% of bromine which comprises suspending about 50% by weight of the dibenzanthrone to be brominated of anhydrous aluminum chloride in chlorsulfonic acid, dissolving dibenzanthrone in the suspension, adding sufficient bromine to effect dibromination, and stirring the reaction mixture at a temperature of 25° C.

4. The product obtained according to the process of claim 3.

5. The process of producing dibromoisoviolanthrene containing about 28% of bromine which comprises suspending about 50% by weight of the isodibenzanthrone to be brominated of anhydrous aluminum chloride in chlorsulfonic acid, dissolving isodibenzanthrone in the suspension, adding a sufficient quantity of bromine to insure dibromination, and agitating the reaction mixture at a temperature of from 25 to 30° C.

6. The product obtained according to the process of claim 5.

7. The process of producing dibromodibenzanthronyl containing about 25.7% of bromine which comprises suspending about 50% by weight of the dibenzanthronyl to be brominated of anhydrous aluminum chloride in chlorsulfonic acid, dissolving 2,2'-dibenzanthronyl in the suspension, adding sufficient bromine to insure dibromination, and agitating the reaction mixture at 25 to 30° C.

8. The product obtained according to the process of claim 7.

References Cited in the file of this patent

UNITED STATES PATENTS

| Number | Name | Date |
|---|---|---|
| 1,003,268 | Just et al. | Sept. 12, 1911 |
| 1,589,303 | Neresheimer | June 15, 1926 |
| 1,791,215 | Kunz et al. | Feb. 3, 1931 |
| 1,925,410 | Siebenburger | Sept. 5, 1933 |
| 1,982,312 | Kunz et al. | Nov. 27, 1934 |
| 1,982,313 | Kunz et al. | Nov. 27, 1934 |